F. W. PHILLIPS.
DIRECTION FINDER AND THE LIKE.
APPLICATION FILED AUG. 10, 1915.

1,213,534.

Patented Jan. 23, 1917.
2 SHEETS—SHEET 1.

INVENTOR:
F. W. PHILLIPS
BY: 
ATTORNEY.

UNITED STATES PATENT OFFICE.

FRANCIS WILLIAM PHILLIPS, OF WORKSOP, ENGLAND.

DIRECTION-FINDER AND THE LIKE.

1,213,534. Specification of Letters Patent. Patented Jan. 23, 1917.

Application filed August 10, 1915. Serial No. 44,726.

*To all whom it may concern:*

Be it known that I, FRANCIS WILLIAM PHILLIPS, a subject of the King of the United Kingdom of Great Britain and Ireland, and resident of Worksop, England, have invented a certain new and useful Improvement in Direction-Finders and the like, of which the following is a specification.

This invention relates to direction determining or orienting instruments of the kind in which a telescope or other device adapted to be directed toward an object, which device may consist of a heliograph, signaling lamp, rifle, gun or the like connected with a pointer adapted to move over a map or the like on a plate beneath the telescope or the like in a manner corresponding to the rotation of the telescope or the like.

The invention has for its object to provide an improved and simplified construction of instrument of this kind adapted for a large variety of purposes and with the map table located beneath the tripod head.

The invention is illustrated in the accompanying drawing in which—

Figure 1:
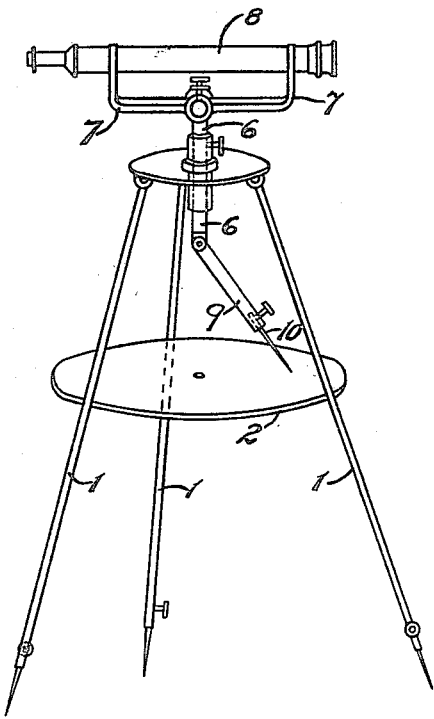
Figure 2:
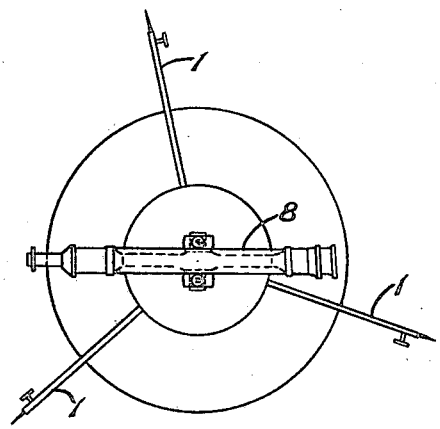
Figure 3:
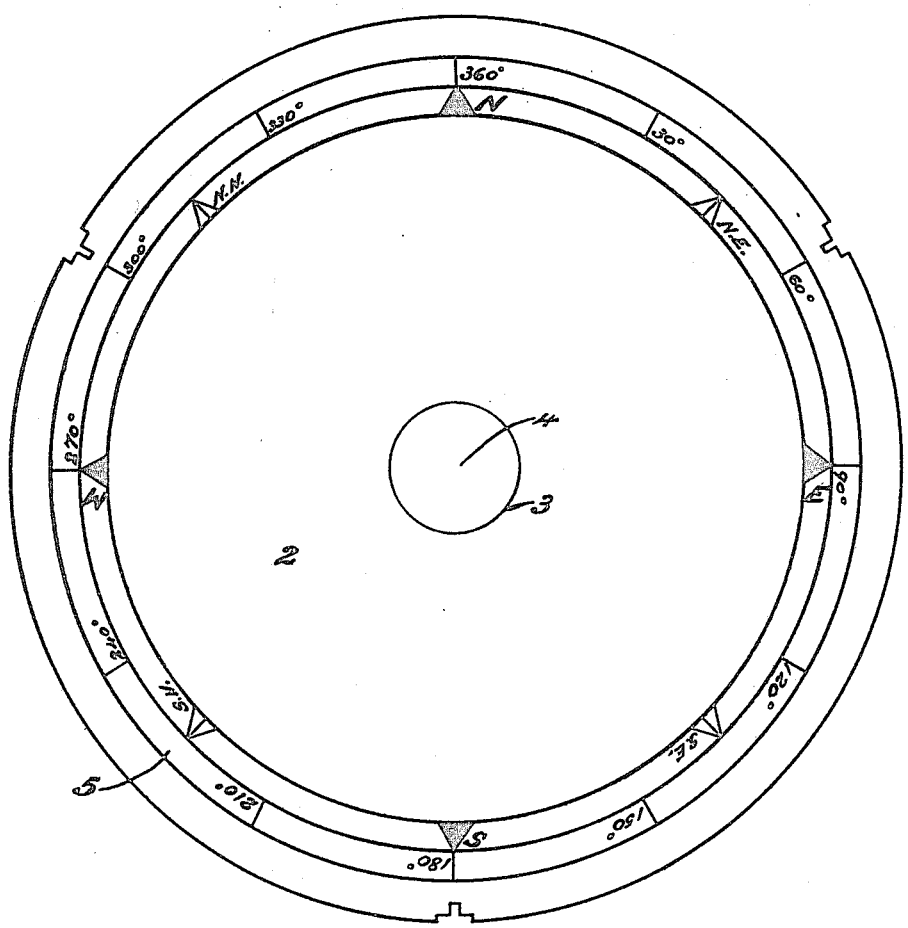

Figure 1 is a perspective view, Fig. 2 a plan view, and Fig. 3 a detail plan view.

The instrument shown comprises a tripod stand having extensible legs 1 permitting adjustment of the level of the tripod and accommodating a table 2 preferably detachably fitted thereto. The said table is fitted with a centrally disposed disk 3 having a central perforation 4 or indentation and around the marginal edge of the table there may be located as heretofore a revoluble ring 5 provided with markings corresponding to the cardinal points of a compass and with degree markings. Journaled in the tripod head is a revoluble spindle 6 carrying at its upper end a cradle 7 adapted to receive the device to be directed, the connection of the cradle with the spindle 6 being such that the device is also capable of elevation or depression so that the device can be directed toward any point, means being provided for locking the device in any position. Pivoted to the lower end of the spindle 6 is an arm 9 confined to move in the vertical plane containing the axis of the telescope when the latter is set in position, said arm being fitted with an axially adjustable pointer 10 adapted to contact with the table. The telescope, when such is to be attached to the instrument, may be held on the cradle 7 by means of iris clips or other devices and these clips may be colored differently to distinguish them from one another.

In the use of the instrument as a direction finder for directing telescopes, heliographs, signaling lamps, etc., toward any point represented on a map, the table is leveled, the map is placed on the table, and perforated at the point which corresponds to the position of the operator. A drawing-pin or peg is inserted through the perforation and the peg or pin pushed into the perforation 4 in the disk 3. By means of the magnetic compass or the like the map is then arranged correctly north to north, etc., and secured on the table by means of drawing-pins or the like. The pointer 10 is then placed on the required position on the map and the telescope or other instrument will then point in the required general direction.

To identify on the map any visible object, the level of the table is adjusted, the map is adjusted on the table as before, and the telescope directed toward the object. The telescope is then locked to prevent movement in a horizontal plane. The sliding pointer is placed on the edge of the table and a cord stretched from the pointer to the center of the table. The object will then be on the line of the cord and the exact position on the line can be found by means of a range finder.

For taking bearings the level of the table is adjusted and the map adjusted on the table as before. A vertical line (a meridian of longitude) is then drawn from the central point to the top of the map and the revoluble ring is then adjusted from this meridian so that "North" on the ring is on the meridian. The ring is then locked in this position. The telescope is then pointed in any direction and by means of the pointer the bearings are found on the revoluble ring.

For map making with the aid of a range finder the level of the table is adjusted and a sheet of paper is fixed in the center of the table, a scale being marked on the sheet. The telescope is then directed to any object it is desired to mark on the map. The telescope is then locked in position and the pointer placed on the edge of the table. A cord is then stretched from the pointer to the center of the table. The distance of the object is ascertained by means of the range finder and the position on the line of the cord can then be marked on the sheet of paper. The map can be completed by determining the distance and position of other visible objects and marking them on the paper in a similar way.

For finding the position of the operator, when two or more visible objects are recognized, the table is leveled, the map is placed on the table, and a small hole made in the map at the place therein corresponding to the position of one of the known visible objects. A drawing-pin or peg is inserted through this hole, and the peg or pin pushed into the center hole of the plate in the map table. The map is arranged correctly north to north, etc., and secured on the table by means of drawing-pins or the like. The telescope is directed toward the object, and is locked to prevent movement in a horizontal plane. The sliding pointer is placed on the map, and a line drawn on the map from the pointer to the center of the table. The map is then secured at the center of the table with a second known visible object and the process is repeated. A cord is stretched along each of the lines drawn on the map, and the point where the lines intersect is the position of the operator.

What I claim is:—

1. An instrument of the kind referred to, comprising in combination, a stand supported on legs; a cradle; means pivotally supporting said cradle on said stand, said cradle adapted to carry the device to be directed toward an object and adapted to perform swiveling movements in relation to said stand, a table carried between the legs of said stand and an extensible pointer pivotally connected with said means and adapted to register with points on said table substantially as and for the purpose set forth.

2. An instrument of the kind referred to, comprising in combination, a stand supported on legs, a spindle extending through said stand and rotatable therein, a cradle carried by said spindle and movable in a vertical plane in relation thereto, said cradle adapted to carry the device to be directed toward an object, a table carried between the legs of said stand and an extensible pointer pivoted to said spindle and adapted to register with points on said table.

In testimony whereof I have signed my name to this specification in the presence of two subscribing witnesses.

FRANCIS WILLIAM PHILLIPS.

Witnesses:
M. SAUNDERS,
W. SAUNDERS.

Copies of this patent may be obtained for five cents each, by addressing the "Commissioner of Patents, Washington, D. C."